2,837,381
REINFORCED TOOL HANDLE ATTACHMENT

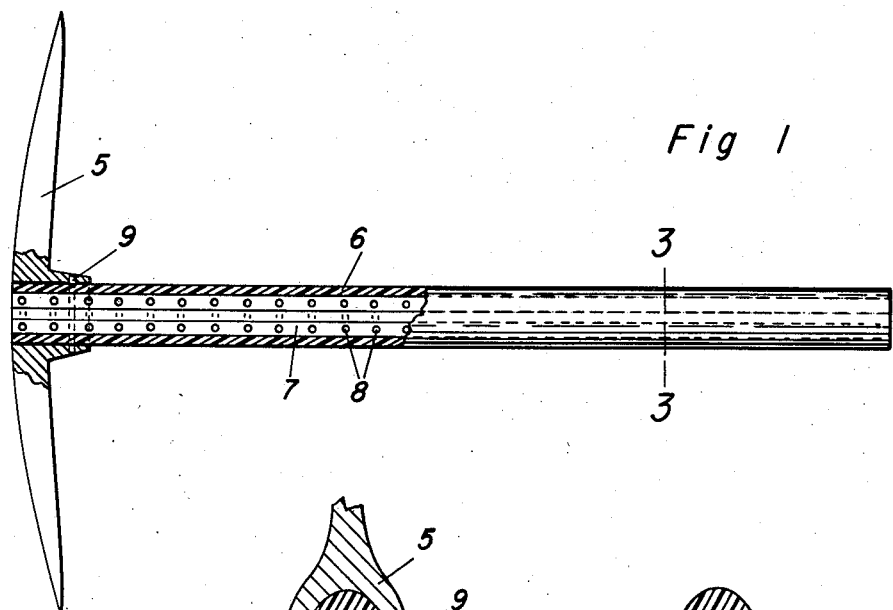
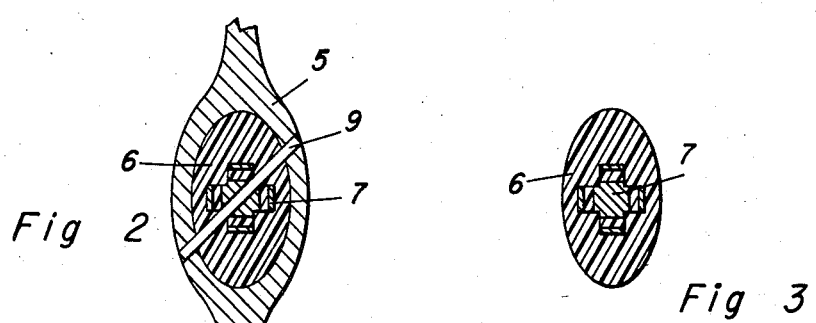
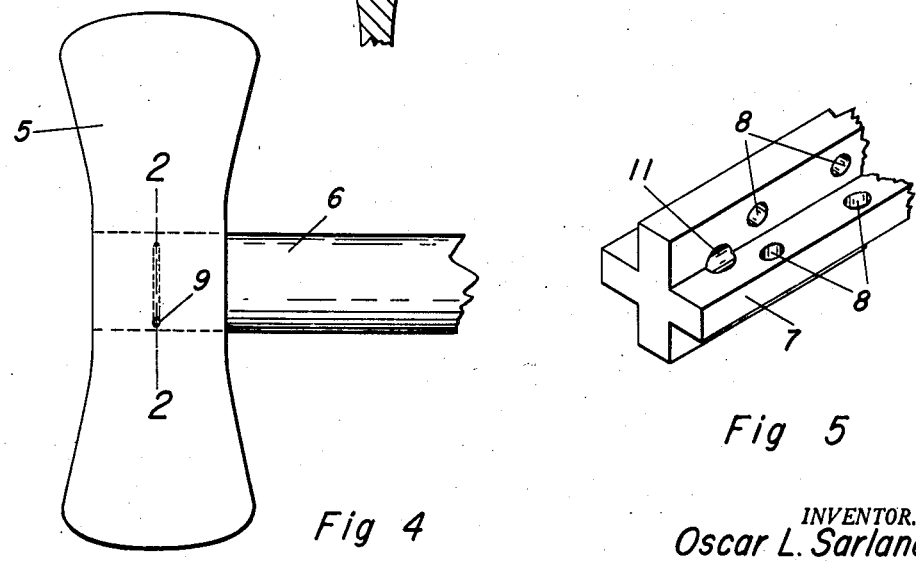

Oscar L. Sarlandt, Guerneville, Calif.

Application November 21, 1955, Serial No. 547,995

1 Claim. (Cl. 306—32)

This invention relates to improvements in tools and has particular reference to a tool handle.

The principal object of this invention is to provide a handle for tools which will have an inherent flexibility.

A further object is to produce a handle which will not crack, split or chip, a handle which is smooth and easy on the hands, and one which is not subject to deterioration by rotting, by insect borings or by fire.

Other objects and advantages will be apparent during the course of the following description.

In the accompanying drawings forming a part of this specification and in which like numbers are employed to designate like parts throughout the same.

Fig. 1 is a side elevation of a pickaxe having my improved handle secured thereto;

Fig. 2 is a fragmentary cross sectional view taken on the line 2—2 of Fig. 4;

Fig. 3 is a cross sectional view taken on the line 3—3 of Fig. 1;

Fig. 4 shows my handle as the same would be used in an ordinary axe; and

Fig. 5 is a fragmentary perspective view of the reinforcing element.

Ordinary tools, such as pickaxes, axes, shovels, sledge hammers and the like, employ a tool portion through which an eye is provided and in which the handle is driven and wedged. This handle, in practically all instances, is made of wood, with the result that when the wood shrinks, the handle becomes loose, or may become loose through the constant weaving of the tool on the handle through use, with the final possibility of flying off the handle.

Also, wooden handles are subject to splitting and have to be replaced quite often. They are also subject to rapid wear and rotting, and if left out in the open, often become worm eaten.

Applicant has therefore devised a handle which is made of molded fibreglass (which term as here used refers to such molded products consisting of glass fibers, together with a plastic binder, which, when molded and cured either hot or cold, form a homogeneous solid mass) in which is embedded a reinforcing element extending the entire length of the handle.

A pin may be driven through the tool, the handle and the reinforcing element, so that the entire device becomes a solid structure, which, when in use, transmits the blows of the tool into and through the handle, thus dissipating the force of the blow throughout the handle.

In the accompanying drawings, wherein for the purpose of illustration is shown a preferred embodiment of my invention, the numeral 5 designates any standard form of tool, as for instance, in Fig. 1 the same being shown as a pickaxe handle and in Fig. 4 as an ordinary axe handle.

My handle consists of a molded mass having glass fibers therein and forming shaft 6, in which is embedded a reinforcing element 7. This reinforcing element is cross-shaped in cross section, as shown in Figs. 3 and 5.

The outstanding ribs of the reinforcing element are each provided with openings 8 therethrough, so that the molded material 6 will enter the openings 8 from opposite sides to join and form a perfect bond around the entire reinforcing element.

In order to secure the tool 5 to the handle, I provide a pin 9 which extends through the tool and through the bore 11 in the reinforcing element, as well as the body of the handle. The result of this construction is that, as fibreglass is quite resilient, when a blow is struck with the tool, the handle will give somewhat and absorb some of the shock. Also, the main shock will be transmitted by the pin 9 to the reinforcing element 7, thus dissipating the shock throughout the entire length of the handle and eliminating any possibility of a loose or weaving action between the tool and the handle. Consequently the handle will not work loose and will outlast the life of the tool.

It will thus be seen that my invention accomplishes all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A handle for a tool having an eye for the reception of a handle of an elongated reinforcing shaft having ribs formed thereon, said shaft having a cross shaped cross-section, said ribs having openings therethrough, a plastic coating forming a handle and surrounding said reinforcing shaft and engaging said openings in said reinforcing shaft, and a pin extending through said handle, said reinforcing shaft, and having its ends engaging the tool body adjacent its eye.

References Cited in the file of this patent

UNITED STATES PATENTS

| 419,953 | Huller | Jan. 21, 1890 |
| 2,205,769 | Sweetland | June 25, 1940 |
| 2,566,517 | Dicks | Sept. 4, 1951 |
| 2,571,717 | Howald | Oct. 16, 1951 |

FOREIGN PATENTS

| 51,836 | Norway | Nov. 28, 1932 |
| 98,736 | Sweden | Apr. 12, 1940 |
| 131,311 | Sweden | Apr. 10, 1951 |